United States Patent Office 3,525,779
Patented Aug. 25, 1970

3,525,779
EPOXY RESIN ADHESIVE CONTAINING MINOR AMOUNTS OF A POLYURETHANE MODIFIER
Jerry Marvin Hawkins, Lake Jackson, Tex., assignor to The Dow Chemical Company, Midland, Mich., a corporation of Delaware
No Drawing. Continuation-in-part of application Ser. No. 570,677, Aug. 4, 1966. This application Nov. 15, 1968, Ser. No. 776,251
Int. Cl. C08g 45/12
U.S. Cl. 260—830
8 Claims

ABSTRACT OF THE DISCLOSURE

A thermosettable resin composition comprising an epoxy resin, a modifier which is the adduct of a polyol and an isocyanate, said adduct having from 0–30% free isocyanate (—NCO) groups and a compound which is nonreactive with the epoxy resin and which contains either an —OH or —SH group in sufficient quantity to react with the free isocyanate groups. This composition is particularly useful in adhesive formulations.

This application is a continuation-in-part of my copending application Ser. No. 570,677 filed Aug. 4, 1966, now abandoned.

This invention relates to improved thermosettable resin adhesive compositions. More particularly, the invention concerns epoxy resins containing a urethane-type modifier, which resins have significantly enhanced adhesion to metals.

It is desirable to provide epoxy resin formulations which are capable of rapid curing to form essentially non-tacky, flexible, thermoset materials having excellent adhesion to metals. Heretofore, efforts to achieve such results have included the utilization of flexibilizing curing agents such as the polyamides or polysulfides; or alternately, incorporating small percentages of elastomeric polymeric materials that are compatible but not reactive with the epoxy resin or hardener.

The flexibilizing curing agents must be employed in a relatively high ratio to the amount of epoxy resin. This alters the physical properties of the cured products so as to reduce such values as the tensile strength and particularly the shear strength. On the other hand, the elastomeric polymers are added in small quantities so that the flexibility of the cured product is enhanced without reducing the physical strength properties. The small quantity added, however, does not allow improvement beyond the increase in flexibility. For example, such properties as peel strength of epoxy adhesives for metals, or physical properties at reduced temperatures in the range of —100° F., are not improved.

According to our invention, rapid curing, essentially non-tacky, epoxy resin adhesive compositions having significantly enhanced adhesion to metals are prepared by addition to the epoxy resin, prior to curing thereof, the reaction product of (1) from about 5 to about 40 parts per hundred parts of epoxy resin (phr.) of an adduct of a polyether polyol with an isocyanate wherein such adduct contains from 0 to up to about 30 percent by weight of free —NCO groups with (2) a compound containing at least one group selected from —OH and —SH which is present in sufficient quantity to react with any free —NCO groups which may be present in the adduct, and which is non-reactive with the epoxy resin.

The polyether polyols which are employed in preparing the epoxy resin modifier (polyol-isocyanate adduct) as contemplated by the present invention, are those prepared by reacting a polyhydroxy compound having a functionality of from about 2 to about 6 such as ethylene glycol, propylene glycol, butylene glycol, glycerine, trimethylol propane, pentaerythritol, sorbitol or a compound having reactive hydrogens such as ethylene diamine and aminoethyl ethanol amine; with an alkylene oxide such as ethylene oxide, propylene oxide, butylene oxide and mixtures thereof. The molecular weight of the polyols may range from about 250 to about 5000 with 1285 to 3500 being the preferred range.

The isocyanates which are employed are those mono and polyfunctional organic isocyanates such as phenyl isocyanate, toluene diisocyanate, polyphenyl polymethyl isocyanate (PAPI), hexamethylene diisocyanate, p,p'-diphenyl methane diisocyanate, fluorinated monoisocyanate having the structure

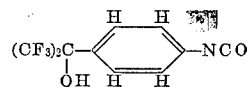

and the like. The invention contemplates the utilization of adducts of such polyether polyols and isocyanates having from 0 up to about 30 percent by weight of free —NCO groups. When free —NCO groups are present, a scavenger is reacted with such adduct in amounts sufficient to react with all of the free NCO groups. Exemplary of such scavengers are the liquid alkanols (methanol, ethanol, propanol, isopropanol, butanol, lauryl alcohol, furfuryl alcohol and the like); substituted alkanols such an benzyl alcohol and the like; polyoxyalkylene glycols (diethylene glycol, triethylene glycol, tetraethylene glycol, dipropylene glycol, tripropylene glycol, tetrapropylene glycol, dibutylene glycol, tributylene glycol, tetrabutylene glycol and the like); unsaturated alcohols such as allyl alcohol, methallyl alcohol, cinnamyl alcohol, 1-butene-4-ol, 1-pentene-5-ol, 1-hexene-6-ol, 2-butene-4-ol, 2-pentene-5-ol and the like; alkylene glycols (ethylene glycol, propylene glycol, butylene glycol); alkyl ethers of glycols (methyl ether of ethylene glycol, ethyl ether of ethylene glycol, n-butyl ether of ethylene glycol, phenyl ether of ethylene glycol, pentane diol, methyl ether of diethylene glycol, ethyl ether of diethylene glycol, n-butyl ether of diethylene glycol, methyl ether of propylene glycol, methyl ether of dipropylene glycol, methyl ether of tripropylene glycol); hydroxy alkyl glycidyl ethers; benzyl alcohol; phenol; water; alkyl thiols (such as methane thiol, ethane thiol, propane thiol, butane thiol, etc.); alkyl dithiols (such as ethane dithiol, propane dithiol, butane dithiol); polythioalkyl dithiols

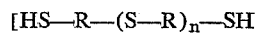

wherein R is ethyl, propyl, butyl, etc. and $n$ is an integer from 1 to about 5]; hydroxy or thiol containing esters of mono and di saturated aliphatic unsaturated aliphatic and aromatic carboxylic acids such as hydroxy ethyl acetate, hydroxy ethyl propionate, hydroxy ethyl butyrate, hydroxy ethyl acrylate, hydroxypropyl acrylate, hydroxy ethyl methacrylate, hydroxypropyl methacrylate, hydroxy ethyl benzoate, hydroxy propyl acetate, hydroxy propyl propionate, hydroxy propyl benzoate, etc. Any compound containing an active hydrogen atom capable of reacting with an —NCO group would be acceptable providing such compound does not also contain a group which will react with the epoxide groups contained in the epoxy resin under conditions encountered during shipment and storage.

A compound containing a —SH group is reactive, under certain conditions such as in the presence of a tertiary amine, with an epoxide group. However, under the conditions employed in the practice of the present invention, the scavengers containing a —SH group will preferentially react with the free —NCO groups in the polyol-isocyanate adduct, with no detectable reaction with the epoxide groups of the epoxy resin.

Commercial epoxy resins of the type described under (A) (below) will contain a measurable concentration of hydroxyl groups. These are secondary aliphatic hydroxyls that are sluggishly reactive with isocyanate. Under the normal reaction conditions chosen, these hydroxyls remain entirely unreactive with the added isocyanate. However, in some cases enough of these hydroxyls are available to react with the added isocyanate without the utilization of an additional scavenger. In order for the reaction to occur, higher reaction temperatures (100–110° C.) and longer reaction times (about 2 hours) are required than for the cases where a scavenger is employed.

The modifiers described herein are useful as adhesion promoting agents for use with a wide variety of the common epoxy resins and epoxy resin mixtures including the glycidyl ethers of polyhydric phenols, bisphenols, glycols, glycerine, polyoxyalkylene glycols, novolac resins and the like, said epoxy resins being represented by the following formulae:

(A)

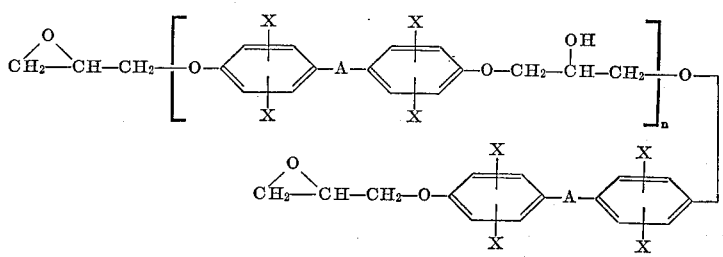

wherein A is selected from the group consisting of an alkylene group having from 1 to 4 carbon atoms,

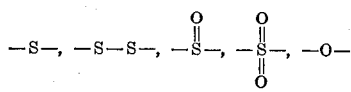

and the like, X is hydrogen or a halogen and $n$ is an integer having an average value of from about 0 to about 15;

(B)

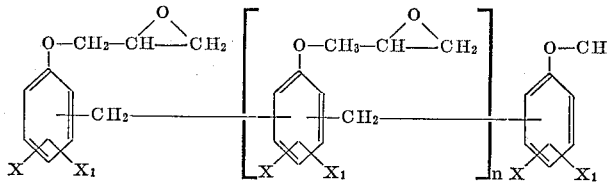

wherein X and $X_1$ are independently selected from the group consisting of hydrogen and a halogen and $n$ is an integer having an average value of from about 0 to about 3;

(C)

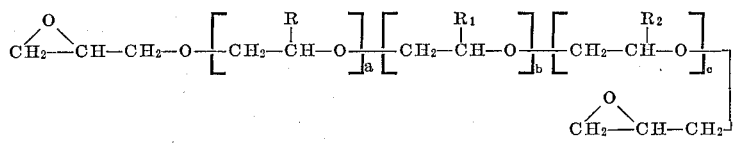

wherein R, $R_1$ and $R_2$ are independently hydrogen, an alkyl or haloalkyl group having from about 1 to about 4 carbon atoms, and $a$, $b$, and $c$ are integers, the sum of which is an integer having an average value of from about 3 to about 40;

(D)

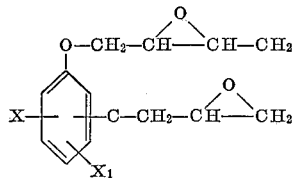

wherein X and $X_1$ are as indicated in Formula B above.

(E)

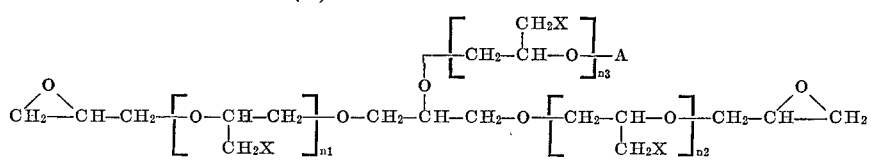

wherein $n_1$, $n_2$, and $n_3$ are integers, the sum of which is an integer having an average value of from about 0 to about 4, X is a halogen and A is hydrogen or the group

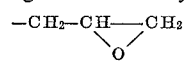

and (F)

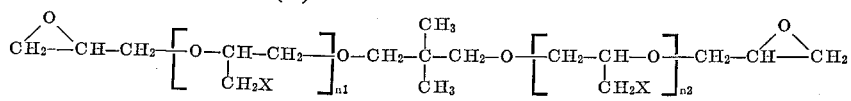

wherein $n_1$ and $n_2$ are integers, the sum of which is an integer from about 0 to about 4 and X is a halogen.

The epoxy resins represented by the Formulae A, B, C, D, E and F above may be referred to as epoxy resins of the polyglycidyl ether type.

The preparation of the epoxy resins represented by Formulae A, B, C and D are well known and need not be discussed further.

The preparation of the epoxy resins represented by Formulae E and F may be prepared by reacting glycerine or neopentyl glycol with an epihalohydrin in the presence of a Lewis acid and subsequently epoxidizing with an alkali metal hydroxide or carbonate in the conventional manner.

Mixtures of various epoxy resins including those described herein may also be employed in the practice of the present invention. It is or should be understood that it is well known that different properties are obtained with different epoxy resins. This invention encompasses any epoxy resin of the glycidyl ether type containing modifiers as described herein wherein said modified epoxy resin provides for improved adhesion to metals as compared to the adhesion of the same epoxy resin without said modifier.

The modified epoxy resin compositions of this invention are preferably prepared by forming the modifier (the reaction product of a polyol-isocyanate adduct with a scavenger containing —OH or —SH groups) in situ in the epoxy resin although in some instances the modifier may be prepared and then blended with the epoxy resin. In the preferred method, the polyol-isocyanate adduct and the —OH or —SH containing compound are added to the epoxy resin along with a suitable catalyst. The reaction is then generally conducted at a temperature of from about 80 to 90° C., at atmospheric or reduced pressures, for a time sufficient (about 30 minutes) to insure the complete disappearance of free —NCO groups (as determined by infrared analysis). Usually a period of about 30 minutes is required. Suitable catalysts are stannous octoate, dibutyl tin dilaurate, and the like. In some instances no catalyst is required if the reaction is conducted under elevated temperatures for extended periods of time, e.g. at about 100° C. for periods of about 2 hours.

In addition, the polyol-isocyanate adduct of the present invention may be added to the epoxy resin in the form of a latex with subsequent removal of water prior to formulation into an adhesive with the addition of fillers, etc. The particular advantage is the simplicity of blending latex with epoxy. Such a latex generally does not contain any free —NCO groups; therefore, the use of a scavenger would not be required.

Diluents may also be added to the modified epoxy resin so as to facilitate ease of handling. Suitable dilutents are butanediol diglycidyl ether, hydroxyethyl glycidyl ether, ethanediol diglycidyl ether, and phenyl glycidyl ether.

Further, the modified epoxy resin of this invention may be blended with most conventional fillers and curing agents. Suitable curing agents are dicyandiamide, n,n-dimethylaminoethylmethacrylamide, diethylaminopropylamine, aminoethyl piperazine, triethanol amine, aminated polyglycols such as aminated P250 (a polyoxypropylene glycol having an average molecular weight of about 250), Nadic® Methyl Anhydride, diallylmelamine, and polyamides such as Versamid® 140, 125, 110, and 115 among others and mixtures thereof. Suitable fillers are aluminum, silica, calcium carbonate, clay, organics, etc. (cellulose, wood, flour, etc.).

Methods of preparing the compositions of the present invention and illustration of desirable and unexpected utility thereof, as adhesive coatings for metals, are presented in the following examples.

EXAMPLE I

The following general procedures were used to prepare the modified epoxy resins of the present invention and to evaluate their effectiveness as adhesives.

(A) Preparation of the adduct of polyether polyol and isocyanate

In each of a series of experiments, varying amounts of one of a series of polyether polyols were individually charged into a 500 ml. 3 neck reaction flask. Thereafter, the flask was purged with nitrogen, heated to a temperature of about 80° C. and varying amounts of one of a series of isocyanates added at a rate sufficient to maintain the reaction temperature between about 80° C. and 90° C. Following addition of the isocyanate, the mixture was allowed to digest at a temperature of about 80° C. with stirring for a period of about 3 hours.

(B) Modification of an epoxy resin

In each of a series of experiments, an epoxy resin was placed in a reactor and agitated while maintaining the

TABLE I.—EFFECT OF POLYOLS

| Modifier identification | Polyol | | | Isocyanate | | Percent— NCO in adduct |
|---|---|---|---|---|---|---|
| | Type [1] | Amount gms. | Equiv. wt. | Type [2] | Amount, gms. | |
| A | P250 | 100 | 128 | TDI | 111 | 4.0 |
| B | E300 | 125 | 142.8 | TDI | 125 | 8.5 |
| C | P400 | 100 | 205 | TDI | 78.8 | 9.8 |
| D | CP700 | 125 | 242 | TDI | 90 | 10.0 |
| E | B2000 | 150 | 1,005 | TDI | 54 | 9.3 |
| F | CP2700 | 200 | 913 | TDI | 38.9 | 4.0 |
| G | CP2700 | 200 | 913 | TDI | 74.9 | 8.4 |
| H | CP2700 | 100 | 913 | TDI | 189.4 | 30.0 |
| I | CP2700 | 200 | 913 | TDI | 74.9 | 9.5 |
| J | CP2700M | 270 | 903 | TDI | 102 | 9.8 |
| K | P4000 | 100 | 2,180 | TDI | 9.35 | 3.6 |
| L | P4000 | 100 | 2,180 | TDI | 30.5 | 9.8 |
| M | CP4000 | 100 | 1,330 | TDI | 15.5 | 3.7 |
| N | CP4000 | 100 | 1,330 | TDI | 33.5 | 9.8 |
| O | CP5000 | 150 | 1,570 | TDI | 48.7 | 9.1 |
| P | CP2700 | 100 | 913 | HMDI | 35.8 | 11.2 |
| Q | Sorbitol based | 100 | 1,288 | TDI | 34.0 | 10.2 |

NOTE:
[1] Polyol Designation:
P250: Polyoxypropylene glycol having an average molecular weight of about 250.
E300: Polyoxyethylene glycol having an average molecular weight of about 300.
P400: Polyoxypropylene glycol having an average molecular weight of about 400.
CP700: Glycerine initiated polyoxypropylene glycol having an average molecular weight of about 700.
B2000: Polyoxybutylene glycol having an average molecular weight of about 2,000.
CP2700: Glycerine initiated polyoxypropylene glycol having an average molecular weight of about 2,700.
CP2700M: A mixture of glycerine initiated polyoxy propylene glycols having molecular weights of from about 260 to about 5,000, the average molecular weight of said mixture being about 2,700.
P4000: Polyoxypropylene glycol having an average molecular weight of about 4,000.
CP4000: Glycerine initiated polyoxypropylene glycol having an average molecular weight of about 4,000.
CP5000: Glycerine initiated polyoxypropylene glycol having an average molecular weight of about 5,000.
Sorbitol based: Sorbitol reacted with propylene oxide to a molecular weight of about 750 followed by the addition of a mixture of 80 mole percent propylene oxide and 20 mole percent ethylene oxide to an equivalent weight of about 1,288.
[2] Isocyanate Designation:
TDI: Toluene diisocyanate.
HMDI: Hexamethylene diisocyanate.

temperature of the reactor at about 85° C. To the reactor was then individually added a polyether polyol adduct prepared as in (A) above, along with varying amounts of types of hydroxy containing compounds (used to react with any free —NCO groups present in the adducts) and a small amount of stannous octoate as a catalyst. Each system was then placed under vacuum with stirring while under a temperature of about 85° C. until all of the isocyanate had been consumed as indicated by infrared analysis.

tiveness of the so-formed modified epoxy resins an adhesives for steel. The polyol-isocyanate adduct was added to 50 grams of DER–332 (the diglycidyl ether of bisphenol A having an epoxide equivalent weight of about 174) in the indicated quantities, followed by the reaction with the indicated quantity of tetraethylene glycol in the presence of a trace amount (approximately 0.05 gram) of stannous octoate as a catalyst. To a portion of the so-modified epoxy resins was added the indicated quantities of the curing agent dicyandiamide and the silica filler.

TABLE II.—EFFECT OF POLYOLS

| | Adhesive Formulation, Modifier | | | | Properties | | |
|---|---|---|---|---|---|---|---|
| Type: | Amount added to epoxy resin phr. | Tetraethylene glycol, (grams) | Curing agent, phr. | Filler, phr. | Approx. resin viscosity, poises | Room temp. peel strength, lb./in. | Room temp. lap shear strength, p.s.i. |
| None | | | 10 | 5 | | 4 | |
| A | 20 | 0.92 | 8 | 5 | 1,000 | 8 | 4,180 |
| B | 20 | 1.98 | 8 | 5 | 500 | 12 | 4,920 |
| C | 20 | 2.26 | 8 | 5 | 100 | 15 | 4,680 |
| D | 20 | 2.36 | 8 | 5 | | 9 | 5,310 |
| E | 20 | 2.20 | 8 | 5 | 100 | 70 | 4,110 |
| F | 20 | 0.92 | 8 | 5 | 100 | 62 | 5,490 |
| G | 20 | 1.98 | 8 | 5 | 50 | 84 | 5,790 |
| H | 20 | 6.85 | 8 | 5 | 10 | 74 | 6,140 |
| I | 20 | 2.20 | 8 | 5 | 50 | 83 | 5,650 |
| J | 20 | 2.15 | 8 | 5 | 100 | 83 | 5,430 |
| K | 20 | 0.83 | 10 | 5 | | 22 | |
| L [1] | 20 | 2.20 | 10 | 5 | | 29 | |
| M | 20 | 0.86 | 10 | 5 | | 47 | |
| N [1] | 20 | 2.20 | 10 | 5 | | 79 | |
| O | 20 | 2.11 | 8 | 5 | 100 | 58 | 3,830 |
| P [1] | 15 | 1.92 | 10 | 5 | 100 | 98 | 5,950 |
| Q | 20 | 2.10 | 10 | | | 72 | |

[1] No stannous octoate catalyst used.

(C) Evaluation of the modified epoxy resin in an adhesive formulation

Individual adhesive formulations were prepared having the following general ratio of formulation ingredients.

|  | Phr. |
|---|---|
| Modified epoxy resin | 100 |
| Hardener (dicyandiamide) | 5–10 |
| Cab-O-Sil (silica filler) | 2.5–5 |
| Al powder | 70 |
| Diluent | 0–20 |

Each formulation was tested as an adhesive for steel by the procedures as described by the ASTM Test No. D–1002 (Lap Shear Test) and No. D–1781 (Climbing Drum Peel Test).

The test specimens for each formulation in this example and all other examples, unless otherwise noted, were cured 20 minutes at 200° C. and for the peel samples they were cured under a platen pressure of 16.5 lbs. per square inch at 200° C. for 20 minutes.

The preceding Table I specifically identifies a series of polyether polyol-isocyanate adducts for subsequent use in combination with varying amounts of tetraethylene glycol.

The following Table II illustrates the combination of the modifiers of Table I with an epoxy resin and the effec- Table III illustrates the effect of various hydroxy containing compounds when used in the modified epoxy resins comprising the present invention. In all the formulations shown in Table III, the designated types and amounts of hydroxy-containing compounds were reacted with an adduct of the polyol and isocyanate, said adduct having been dispersed in the epoxy resin to the extent of 20 phr. of the adduct before the addition of the hydroxy containing compounds. The polyol was CP2700 or CP2700M as indicated. The isocyanate was toluene diisocyanate (TDI). The epoxy resin was the diglycidyl ether of bisphenol A having an epoxide equivalent weight of 174 (DER–332). Thereafter, in all instances, to a portion of the thus modified epoxy resins was added and thoroughly mixed 8 phr. dicyandiamide and 5 phr. of silica filler (Cab-O-Sil). The formulations were then evaluated as adhesives as indicated.

TABLE III.—EFFECT OF DIFFERENT HYDROXY CONTAINING COMPOUNDS

| MODIFIER | | | | | Properties | |
|---|---|---|---|---|---|---|
| Hydroxy containing compound, type | Amount, gms. | Catalyst, gms. | Adduct, gms. | Epoxy, gms. | Room temp. peel strength, lb./in. | Room temp. lap shear strength, p.s.i. |
| Ethanol [1] | 1.07 | Sn octoate (.025) | 10 | 50 | 58 | 4,950 |
| Tetraethylene glycol [1] | 2.96 | do | 10 | 50 | 83 | 5,530 |
| Diethylene glycol n-butyl ether [2] | 2.86 | Sn octoate (.020) | 8 | 40 | 63 | |
| Tripropylene glycol [2] | 1.72 | do | 8 | 40 | 51 | |
| Hydroxyethyl glycidyl ether [2] | 2.75 | Sn octoate (.025) | 10 | 50 | 57 | 4,700 |
| Benzyl alcohol [3] | 10.5 | Sn octoate (.05) | 20 | 100 | 97 | |
| Allyl alcohol [1] | 2.9 | do | 20 | 100 | 80 | 5,160 |
| Methallyl alcohol [1] | 3.12 | do | 20 | 100 | 65 | 5,600 |
| Cinnamyl alcohol [1] | 15.1 | do | 45 | 150 | 90 | 4,350 |
| Hydroxy ethyl acrylate [1] | 7.54 | do | 30 | 150 | 40 | 5,620 |

[1] Polyol was CP2700 as described following Table I.
[2] Polyol was CP2700M as described following Table I.
[3] CP2700 type adduct was added to DER–331 (EEW=189) instead of DER–332.

Table IV illustrates the effects of using different epoxy resins. In all formulations illustrated, stannous octoate was used as a catalyst for the reaction of the adduct and the tetraethylene glycol. Further, from 8 to 10 phr. of dicyandiamide curing agent and from 5 to 6 phr. silica filler were added to a portion of each of the modified epoxy resins prior to evaluation of such resins as adhesives.

TABLE IV.—EFFECT OF EPOXY RESINS

| Modified Epoxy Resins | | | | | | | | | Properties | |
|---|---|---|---|---|---|---|---|---|---|---|
| Epoxy resin | | | Adduct | | | Tetra-ethylene glycol, gms. | Diluent type [4] | Phr. | Room temp. peel strength, lb./in. | Room temp. lap shear strength, p.s.i. |
| Type [1] | Gms. | EEW [2] | Polyol [3] | Isocyanate | Percent —NCO | Gms. | | | | |
| DEN-438<br>DER-337<br>DER-332 | 40<br>60<br>25 | 178<br>240<br>174 } CP2700 | TDI | 9.8 | 36 | 8.8 | Araldite RD-2 | 16 | 89 | 5,100 |
| DER-332 | 50 | 174 | CP2700M | TDI | 9.8 | 10 | 2.3 | None | | 83 | 5,436 |
| DER-331 | 50 | 189 | CP2700M | TDI | 9.8 | 10 | 2.3 | do | | 100 | 4,706 |
| DER-337 | 45 | 240 | CP2700M | TDI | 9.8 | 10 | 2.3 | Araldite RD-2 | 11 | 125 | 5,196 |
| EPON® 834 | 45 | 255 | CP2700M | TDI | 9.8 | 10 | 2.3 | do | 11 | 113 | 4,490 |
| DER-332<br>DER-667 | 10<br>2 | 174<br>1,800 } CP2700M | TDI | 9.8 | 2 | 0.4 | None | | 95 | |
| DER-337<br>Ethyl-Acrylate latex [5] | 100<br>2.3 | 240 | CP2700M | TDI | 9.8 | 20 | 4.5 | Araldite RD-2 | 20 | 115 | 5,00 |
| DEN-439<br>DER-337<br>DER-332 | 50<br>50<br>25 | 205<br>240<br>174 } CP2700M | TDI | 9.8 | 20 | None | do | 20 | 40 | |
| DGENG | 150 | 138 | CP2700 | TDI | 9.1 | 30 | 6.25 | None | | 78 | |

[1] Epoxy Resins:
DEN-438:

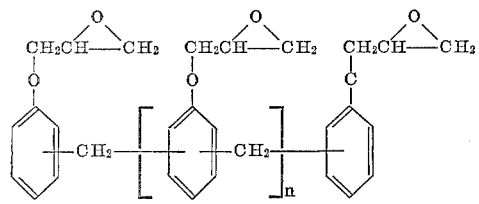

where n has an average value of about 1.6.
DEN-439: A semisolid novolac based epoxy resin having an EEW of about 205.
DER Series and EPON:

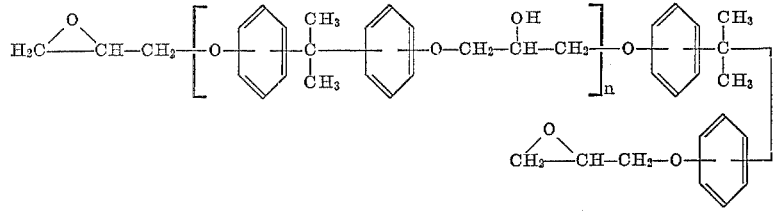

DER-337: n has an average value of about 0.493.
DER-332: n has an average value of about 0.028.
DER-331: n has an average value of about 0.134.
EPON® 834: n has an average value of about 0.598.
DER-667: n has an average value of about 11.5.
DGENG: The Lewis acid catalyzed reaction product of neopentyl glycol with epichlorohydrin at a ratio of about 2 moles epichlorohydrin per mole of glycerine followed by expoxidation of the halohydrin with caustic
[2] EEW: Epoxy equivalent weight.
[3] Polyol: See description following Table I.
[4] Araldite RD-2: Butanediol diglycidyl ether.
[5] Ethylacrylate latex: An acrylate comprising 87% by weight ethylacrylate, 5% vinyl cyanide (acrylonitrile), 5% hydroxy ethyl acrylate and 3% methacrylic acid. The water contained in the latex was removed by flashing after it had been thoroughly mixed with the epoxy resin.

Table V illustrates the effect of various diluents which are useful in preparing the modified epoxy resins of the present invention. All formulations shown are formed from an adduct of a mixture of polyoxypropylene glycols made from propylene oxide initiated with glycerine, said mixture having an average molecular weight of 2700 (CP2700M), and toluene diisocyanate (TDI) wherein the adduct contains 9.8 percent of NCO. In each instance, the modifier (20 grams) was added to 100 grams of a diglycidyl ether of bisphenol A having an average $n$ value of 0.493 and then 4.2 gms. tetraethylene glycol was used to react with the free NCO using a trace amount (approximately 0.05 gm.) of stannous octoate as a catalyst. To each formulation was then added 10 phr. of dicyandiamide and 5 phr. of silica filler and the designated types and amounts of diluent. The compositions were then evaluated as adhesives.

TABLE V.—EFFECT OF DILUENTS

| Diluent | | Properties | |
|---|---|---|---|
| Type | Amount, phr. | Peel strength, lb./in. | Lap shear strength p.s.i. |
| None | 0 | 108 | 5,700 |
| Butanediol diglycidyl ether | 20 | 100 | 5,520 |
| Hydroxyethyl glycidyl ether | 20 | 55 | 3,660 |
| Ethanediol diglycidyl ether | 20 | 105 | 6,080 |
| Phenyl glycidyl ether | 20 | 11 | 4,400 |
| Mixture of aliphatic diepoxides [1] | 15 | 65 | 4,450 |

[1] A mixture comprising 3 parts by weight of the diglycidyl ether of a polyoxypropylene glycol having an average molecular weight of about 400, said ether having an EEW of about 320 and 1 part by weight of the diglycidyl ether of a polyoxypropylene glycol having an average molecular weight of 250, said ether having an EEW of about 190.

Table VI illustrates the effects of using various isocyanates in preparing the modified epoxy resins of the present invention. In each illustrated formulation the designated amounts and types of isocyanates were reacted with the specified amounts of a polyoxypropylene glycol made from propylene oxide initiated with glycerine to a molecular weight of 2700 (CP2700) and then reacted with the specified amounts of tetraethylene glycol, in the presence of catalytic amounts of stannous octoate, while admixed with the specified amounts of a diglycidyl ether of bisphenol A having an epoxy equivalent weight of 174. Portions of the so-formed modified epoxy resins were then each admixed with 8 to 10 phr. dicyandiamide and 5 phr. silica filler, prior to evaluation as adhesives.

adduct of 270 grams of polyether polyol CP2700M having an equivalent weight of 903, with 102 grams of toluene diisocyanate (wherein the adduct contained 9.8 percent of free —NCO); (2) adding 40 phr. of such adduct to a diglicidyl ether of bisphenol A having an epoxy equivalent weight of 174; and (3) adding tetraethyelne glycol in the presence of catalytic amounts of stannous octoate to react all the isocyanate groups present. Thereafter, additional quantities of the unmodified epoxy resin were added to portions of the modified epoxy resin to give the desired modifier concentrations; along with 8 phr. of dicyandiamide, 5 phr. of silica filler, and 70 phr. of alumi-

TABLE VI.—EFFECTS OF ISOCYANATES

| Modified Epoxy Resin | | | | Amount adduct in epoxy resin, phr. | TEG[2], gms. | Adhesive Properties | |
|---|---|---|---|---|---|---|---|
| | Gms. | Polyol; gms. | Percent —NCO | Epoxy resin, gms. | | | Peel strength, lb./in. | Lap shear strength, p.s.i. |

| Isocyanate type [1]: | | | | | | | | |
|---|---|---|---|---|---|---|---|---|
| TDI | 37.4 | 100 | 8.4 | 50 | 20 | 1.9 | 84 | 5,790 |
| HMDI | 35.8 | 100 | 11.4 | 53 | 15 | 4.61 | 98 | 5,950 |
| PI | 13.7 | 100 | 0 | 50 | 30 | None | 46 | |
| FI | 10.0 | 32 | 0 | 5 | 20 | None | 59 | |
| Mondur ® MR | 61.5 | 100 | 9.8 | 50 | 20 | [3] 3.8 | 60 | 5,210 |
| Multrathane ® M | 60.5 | 100 | 10.3 | 60 | 30 | 4.28 | 65 | 5,920 |

[1] Isocyanates: TDI=Toluene diisocyanate; HMDI=Hexamethylene diisocyanate; PI=Phenylisocyanate; FI=Fluorinated isocyanate (see formula in col. 2 of this application); Mondur MR=Crude p,p'-diphenyl methane diisocyanate (functionality greater than 2.0); Multrathane M=Essentially pure p,p'-diphenyl methane diisocyanate.
[2] Tetraethylene Glycol.
[3] Dowanol® DB (n-butyl ether of diethylene glycol) employed instead of TEG.

Table VII shows the effects of using various hardeners (curing agents) in preparing thermoset modified epoxy resins according to the present invention. In each formulation a modified epoxy resin was prepared by (a) forming an adduct of 200 grams of polyol CP2700 having an equivalent weight of 913 and 74.9 grams of toluene diisocyanate (wherein the adduct contained 8.4 percent free —NCO); (b) mixing 0 to 20 phr. of the so-formed modifier with 10 to 100 grams of a diglycidyl ether of bisphenol A having an epoxy equivalent weight of 174, (c) reacting the adduct contained in the mixture with a stoichiometric amount of tetraethylene glycol. A portion of the thus modified epoxy resin was then admixed with 5 phr. of silica filler. Each mixture was then evaluated as an adhesive, after combining with the quantity of curing agent listed in Table VII.

num powder filler. The mixtures were then evaluated as adhesives as indicated.

TABLE VIII.—EFFECT OF MODIFIER CONCENTRATION ON ADHESION

| | Peel strength, lbs./in. | | | |
|---|---|---|---|---|
| | −67° C. | 25° C. | +180° C. | +250° C. |
| Modifier, phr.[1]: | | | | |
| 0 | 4 | 4 | 5 | 13 |
| 10 | 23 | 43 | 57 | 53 |
| 15 | 43 | | 72 | 54 |
| 20 | 32 | 84 | 53 | 47 |
| 25 | 31 | 70 | 67 | 44 |
| 30 | 11 | 30.2 | 51 | 41 |
| 40 | 6 | 10.5 | 36 | 18 |

[1] Based on that portion of the weight of the modifier contributed by the polyol-isocyanate adduct only.

Table IX illustrates similar data obtained by utilization

TABLE VII.—EFFECT OF CURING AGENT

| Curing agent, type | Amount phr. | Epoxy resin modifier, phr. | Epoxy resin, gms. | Peel strength, lb./in. |
|---|---|---|---|---|
| Dicyandiamide | 8 | 20 | 50 | 84 |
| Do | 8 | 0 | 50 | 4 |
| DER-331-diethylene triamine adduct (1:1 by wt.) | 30 | 20 | 50 | [4] 6 |
| Do | 30 | 0 | 50 | [4] 4 |
| Aminated P250 polyglycol [1] | 48.5 | 20 | 50 | [4] 50 |
| Do [1] | 48.5 | 0 | 50 | [4] 6 |
| Versamid ® 140 [2] | 87 | 20 | 50 | [4] 12 |
| Do [2] | 87 | 0 | 50 | [4] 6 |
| Nadic ® methyl anhydride plus 0.5 phr. benzyl dimethyl amine [3] | 85 | 20 | 100 | 10 |
| Do [3] | 85 | 0 | 100 | 5 |
| Triethanolamine | 12 | 20 | 10 | [5] 46 |
| Do | 12 | 0 | 10 | [5] 7 |

[1] Polyoxypropyleneglycol diamine having an average molecular weight of about 250.
[2] Condensation product of polyamines and the dibasic acids obtained when certain unsaturated fatty acids are polymerized.
[3]

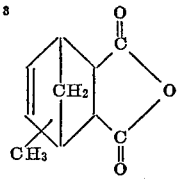

[4] Cure schedule=90° C. for 4 hrs. at 16.5 lb./in.[2] platen pressure, and 80° C. for 10 hrs. (no pressure).
[5] Cure schedule=230° F. (110° C.) for 16 hrs. at 16.5 lb./in.[2] platen pressure.

Table VIII illustrates the effect of modifier concentration on the adhesion properties of the modified epoxy resins of the present invention. In each formulation the modified epoxy resin was prepared by (1) utilizing an of a modified epoxy resin prepared by (1) utilizing an adduct of polyether polyol CP2700 with toluene diisocyanate which adduct contains 9.8 percent free NCO, (2) adding said adduct in the desired concentration to a mixture of the epoxy resins DER–337, DER–332, and DEN–438, and reacting the adduct contained in the epoxy resin mixture with tetraethylene glycol in the presence of stannous octoate. Thereafter a portion of each modified epoxy resin was individually admixed with 80 phr. aluminum powder filler, 6 phr. of silica filler, 0.3 phr. glycerine, 10 phr. dicyandiamide, and 1.5 phr. melamine.

The compositions were then evaluated as adhesives at the indicated test temperatures.

Adhesives were prepared by adding 10 phr. dicyandiamide to portions of the above modified epoxy resin and additional quantities of DER–332 required to prepare adhesives containing 20 and 15 phr. modifier (polyol-TDI adduct). The compositions containing 15 phr. and 20 phr. of the modifier were liquids as compared to the slight gel of the 30 phr. composition. Steel test specimens were prepared from each of the compositions with the following results.

TABLE IX.—EFFECT OF MODIFIER CONCENTRATION ON ADHESION

| Modifier Epoxy Resin | | | Properties | | | | | | | | | |
|---|---|---|---|---|---|---|---|---|---|---|---|---|
| Modifier, phr. | Epoxy Resin [1] | | Peel Strength, lbs./in. | | | | | | | | | |
| | Type | Gms. | 300° F. | 250° F. | 77° F. | 77° F. | 0° F. | −30° F. | −67° F. | −100° F. | −200° F. |
| 20 | DER–337 | 80 | | | 5 | 64 | 88 | 65 | 53 | 8 | 4 | |
| | DER–332 | 20 | | | | | | | | | | |
| 28.8 | DER–337 | 60 | 1.5 | 12 | 42 | 83 | 62 | 62 | 68 | 51 | 44 |
| | DER–332 | 25 | | | | | | | | | | |
| | DEN–438 | 40 | | | | | | | | | | |
| 20 | DER–337 | 80 | 0 | 0 | | 116 | | | 61 | 16 | |
| | DER–332+2.3 phr. ethyl acrylate latex | 20 | | | | | | | | | | |

[1] Each of the above epoxy resin mixtures contained 20 phr. of the diluent butanediol diglycidyl ether.

EXAMPLE II

The modified epoxy resin compositions of this invention may be formed into films so as to be employed as film adhesives. An example of such an application is as follows:

(1) A modifier was prepared by reacting 26.9 grams of hexamethylene diisocyanate with 100 grams of CP2700.

(2) 10 grams of the modifier was admixed with 50 grams of molten DER–661.

(3) 1.57 grams of tetraethylene glycol was added (no catalyst) to the mixture so as to react with the —NCO groups present therein.

(4) 2.5 grams of dicyandiamide was then blended into the mixture.

(5) A film was prepared by melting the composition between two ¼" thick sheets of Teflon® at 115° C. in a hot press.

(6) After cooling, the Teflon® backing was removed and the thin sheet of adhesive material was cut into 1" strips. Even at room temperature the films were somewhat flexible.

(7) The 1" strips were employed as the adhesive for steel strips by placing the strip of adhesive between overlapping sections of two steel strips and curing in a hot press at 360° F. for 40 min. The peel strength of this film adhesive was found to be 102 lbs./in.

When polyols that have a tertiary nitrogen group present such as those initiated with ethylene diamine and aminoethylethanol amine are employed, the catalytic effect which the tertiary nitrogen has toward crosslinking of the adduct must be inhibited. One method of inhibiting the catalytic effect is to convert the amine polyol to its hydrochloride salt by contacting the polyol with anhydrous HCl as in the following example.

EXAMPLE III

In a suitable reaction flask was bubbled anhydrous HCl through 83.2 grams of a polyol prepared by reacting ethylene diamine with propylene oxide to a molecular weight of 3000 followed by the addition of ethylene oxide until a molecular weight of 3500 was obtained.

After infrared confirmed the conversion of the tertiary amine groups to their hydrochloride form, a modifier adduct was prepared by the dropwise addition of 30.9 grams of toluene diisocyanate at a temperature of about 80–85° C. followed by digestion for an additional 4 hours. The adduct contained 8.8% —NCO.

A modified epoxy resin was prepared by mixing 18 grams (30 phr.) of the adduct to 60 grams DER–332 (previously described) and reacting with 4 grams tetraethylene glycol. After 15 minutes at 90° C. a light gel formed. The NCO content had been reduced to practically zero.

| Modifier conc. (phr.): | Peel strength (lb./in.) |
|---|---|
| 15 | 46 |
| 20 | 63 |
| 30 | 77 |

The following example demonstrates the utility of a thiol as the scavenger and that the scavenger may be added to the polyol-isocyanate adduct (modifier) prior to its addition to the epoxy resin and that a tertiary amine may be added so as to catalyze the reaction between the NCO and the scavenger.

EXAMPLE IV

To a suitable reaction vessel was charged 25 grams of an adduct of CP2700 with toluene diisocyanate containing 9.8% —NCO, 50 grams methyl isobutyl ketone and 0.1 gram Dabco® (triethylenediamine). The contents were heated to 80° C. and 4.4 grams of butanethiol was added over a period of about 15 minutes and digested at 80° C. for 2½ hours and 15 hours at room temperature. The methyl isobutyl ketone solvent was then removed by stripping under vacuum. To 31.5 grams of DER—332 was added 6.3 grams of the above prepared modifier. The methyl isobutyl ketone was removed under vacuum and an adhesive prepared from a portion of the modified epoxy resin composition by admixing 2.5 grams (8 phr.) dicyandiamide and 1.5 grams (5 phr.) of silica filler. The adhesive was then tested and found to have a peel strength of 84 lbs./in. and a lap shear strength of 4020 p.s.i.

EXAMPLE V

To a suitable reaction vessel was charged 100 grams of DER–332 having an epoxide equivalent weight of 174. After heating to 110° C., 67 grams of P102 urethane latex [1] (44.9% solids) diluted with an equal volume of water to approximately 22.45% solids was added to the DER–332 in a dropwise manner while maintaining the temperature at 90° C. The water was then removed by heating at 90° C. and 35 mm. Hg for one hour.

Adhesive compositions were then prepared from the resultant modified epoxy resin at different modifier levels by diluting portions of the above modified DER–332 with unmodified DER–332 and then blending into each sample Cab-O-Sil silica filler and dicyandiamide curing agent. The various samples were then evaluated as adhesives employing steel test specimens with the following results.

| Total quantity of DER–332, gms. | Modifier | | Dicyandiamide, gms. | Cab-O-Sil, gms. | Room temp. peel strength, lbs./in. |
|---|---|---|---|---|---|
| | Level, phr. | Quantity, gms. | | | |
| 15.4 | 30 | 4.6 | 1.54 | .77 | 50 |
| 23.0 | 20 | 4.6 | 2.3 | 1.15 | 50 |
| 46.0 | 10 | 4.6 | 4.6 | 2.3 | 30 |

[1] Urethane latex P102A is a high tensile strength, nonionic, urethane co-polymer dispersed in water, having a fusion time of 10 minutes at 300° F., sold commercially by Wyandotte Chemicals Corp. The —NCO content was 0%.

EXAMPLE VI

A reaction vessel containing 50 grams of DER–331, 9.5 grams of an adduct of CP2700 and toluene diisocyanate (9.1% isocyanate) and 0.05 gram stannous octoate was heated at 130° C. for 1 hour. Infrared analysis of the resultant product revealed that no free —NCO groups were present.

A test specimen was prepared from an adhesive comprising 120 parts by weight of the above modified epoxy resin, 8 phr. of dicyandiamide and 5 phr. silica filler. The test specimen had a peel strength of 86 lbs./in. after curing in a press at a platen pressure of 16.5 lbs. per square inch for 20 minutes at 200° C.

The novel modified epoxy resins described herein have particularly valuable utility as adhesives for metals such as stainless steel, low carbon high strength steel, copper and aluminum, among others. As specifically set forth herein, such utility extends over a wide range of temperatures, i.e. for temperatures ranging from about —200° F. to greater than 250° F. Further, such modified epoxy resins may be advantageously used as film type adhesives, castings, coatings, and laminates, as well as for use in preparing reinforced plastics, coatings, potting compounds, and the like.

What is claimed is:

1. A curable resin composition comprising essentially:
   (A) an epoxy resin of the polyglycidyl ethers of polyhydric phenols and alcohols type, and
   (B) a modifier, comprising the reaction product of
      (1) from about 5 to about 40 parts per hundred parts of said epoxy resin of an adduct of a polyether polyol and an organic isocyanate, said adduct having from 0 up to about 30 percent by weight of free —NCO groups, with
      (2) a scavenger compound which is non-reactive with said epoxy resin and which contains at least one active group from the class consisting of —OH and —SH in sufficient quantity to react with said free —NCO groups.

2. The resin mixture of claim 1 wherein said polyether polyol has a molecular weight of from about 250 to about 5000.

3. A method of enhancing the adhesion of thermosettable epoxy resins of the polyglycidyl ethers of polyhydric phenols and alcohols type to metals comprising adding to said epoxy resins, prior to curing said resins to a thermoset condition, the reaction product of (1) from about 5 to about 40 parts per hundred parts of said epoxy resin of an adduct of a polyether polyol with an isocyanate wherein said adduct contains from 0 up to about 30 percent by weight of free —NCO with (2) a compound containing at least one group selected from —OH and —SH which is in sufficient quantity to react with any free —NCO contained in said adduct and which is non-reactive with said epoxy resins.

4. The method of claim 3 wherein said polyether polyol has a molecular weight of from about 250 to 5000.

5. An adhesive in film form which comprises
   (A) a solid epoxy resin of the polyglycidyl ethers of polyhydric phenols and alcohols type,
   (B) from about 5 to 40 parts per hundred parts of said epoxy resin of an adduct of a polyether polyol with an isocyanate, said adduct having from 0 to about 30 percent by weight of free —NCO groups,
   (C) a compound which is non-reactive with said epoxy resin and which contains at least one group selected from the class consisting of —OH and —SH in sufficient quantity to reduce the NCO content of (B) to substantially zero and
   (D) a curing amount of a latent curing agent.

6. The film adhesive of claim 5 wherein latent curing agent is dicyandiamide.

7. A curable resin composition comprising in admixture
   (A) an epoxy resin of the polyglycidyl ether of a bisphenol type containing secondary aliphatic hydroxyl groups, and
   (B) from about 5 to about 40 parts per hundred parts of said epoxy resin of an adduct of a polyether polyol and an organic isocyanate, said adduct having from 0 up to about 30 percent by weight of free —NCO groups, and wherein (A) and (B) have been heated at a temperature of at least about 100° C. until the —NCO content of said composition is substantially zero.

8. A curable resin composition comprising in admixture
   (A) an epoxy resin of the polyglycidyl ethers of polyhydric phenols and alcohols type, and
   (B) from about 5 to about 40 parts per hundred parts of said epoxy resin of a urethane polymer wherein said urethane polymer is free from —NCO groups and is admixed with (A) while in the form of a latex, and wherein the water content of said composition is substantially zero.

References Cited

UNITED STATES PATENTS

| | | | |
|---|---|---|---|
| 3,148,167 | 9/1964 | Keplinger | 260—830 |
| 3,158,586 | 11/1964 | Krause | 260—830 |
| 3,238,273 | 3/1966 | Hampson | 260—830 |
| 3,239,580 | 3/1966 | Pendleton | 260—830 |
| 3,309,261 | 3/1967 | Schiller | 260—830 |
| 3,324,974 | 6/1967 | Champlin | 260—830 |
| 3,380,950 | 4/1968 | Blomeyer | 260—830 |

PAUL LIEBERMAN, Primary Examiner

U.S. Cl. X.R.

260—2, 5, 13, 18, 30.4, 37, 47, 77.5, 836, 837; 161—186